United States Patent [19]

Kishimoto et al.

[11] Patent Number: 5,539,640
[45] Date of Patent: Jul. 23, 1996

[54] ROAD SURFACE CONDITION DETERMINING METHOD AND SUSPENSION CONTROLLING DEVICE

[75] Inventors: Naohiro Kishimoto; Hiroaki Yoshida, both of Okazaki; Kiichi Yamada, Nagoya; Kazuya Hayafune, Okazaki, all of Japan

[73] Assignee: Mitsubishi Jidosha Kogyo Kabushiki Kaisha, Tokyo, Japan

[21] Appl. No.: 524,152

[22] Filed: Aug. 18, 1995

Related U.S. Application Data

[63] Continuation of Ser. No. 16,970, Feb. 12, 1993, abandoned.

[30] Foreign Application Priority Data

Feb. 14, 1992 [JP] Japan .................................. 4-028396
Feb. 14, 1992 [JP] Japan .................................. 4-028397

[51] Int. Cl.[6] .................................................. G01B 5/28
[52] U.S. Cl. .................................. 364/424.05; 364/424.1
[58] Field of Search ........................... 364/424.05, 424, 364/424.1, 424.04, 424.01; 280/707

[56] References Cited

U.S. PATENT DOCUMENTS

| | | | |
|---|---|---|---|
| 4,589,676 | 5/1986 | Meloche et al. | 280/707 |
| 5,034,890 | 7/1991 | Sugasawa et al. | 364/424.05 |
| 5,060,157 | 10/1991 | Tado et al. | 364/424.05 |
| 5,075,855 | 12/1991 | Sugasawa et al. | 364/424.05 |
| 5,090,728 | 2/1992 | Yokoya et al. | 280/707 |
| 5,101,355 | 3/1992 | Wada et al. | 364/424.05 |
| 5,134,566 | 7/1992 | Yokoya et al. | 364/424.05 |
| 5,138,554 | 8/1992 | Wada | 364/424.05 |
| 5,141,245 | 8/1992 | Kamimura et al. | 280/707 |
| 5,200,895 | 4/1993 | Emura et al. | 364/424.05 |
| 5,218,546 | 6/1993 | Bradshaw et al. | 364/424.05 |
| 5,269,557 | 12/1993 | Butsuen et al. | 280/707 |
| 5,289,379 | 2/1994 | Williams | 364/424.05 |

FOREIGN PATENT DOCUMENTS

| | | | |
|---|---|---|---|
| 0151421 | 8/1985 | European Pat. Off. | B60G 17/00 |
| 0246772 | 11/1987 | European Pat. Off. | B60G 17/00 |
| 0265911 | 5/1988 | European Pat. Off. | B60G 17/00 |
| 0385723 | 9/1990 | European Pat. Off. | B60G 17/00 |
| 4011976 | 10/1990 | Germany | B60G 17/06 |
| 3016820 | 1/1991 | Japan | B60G 17/00 |
| 3227711 | 10/1991 | Japan | B60G 17/15 |

OTHER PUBLICATIONS

"Controlled Vehicle Suspension Using FFT," disclosed by Kamal N. Majeed and Donald E. Graham, Research Disclosure, vol. 286, No. 59, Feb. 1988.

Primary Examiner—Raymond J. Bayerl
Assistant Examiner—Steven P. Sax

[57] ABSTRACT

A determining method of this invention includes a step of continuously measuring the relative movement between the wheel and the vehicle body by use of a linear stroke sensor while a motor vehicle is running; a step of creating spectral distribution by subjecting the output of the linear stroke sensor to the frequency analysis; a step of calculating characteristic values inherent to various types of road surfaces; and a step of specifying the type of the road surface based on the calculated characteristic values. When the type of the road surface is specified, the control device of this invention changes the damping force of the suspension to a level corresponding to the type of the road surface.

18 Claims, 9 Drawing Sheets

RULE 1

FIG. 13A  FIG. 13B  FIG. 13C

RULE 2

FIG. 14A  FIG. 14B  FIG. 14C

RULE 3

FIG. 15A  FIG. 15B  FIG. 15C

RULE 4

FIG. 16A  FIG. 16B  FIG. 16C

RULE 5

ROAD SURFACE CONDITION DETERMINING METHOD AND SUSPENSION CONTROLLING DEVICE

This application is a continuation, of application Ser. No. 08/016,970 filed on Feb. 12, 1993, now abandoned.

BACKGROUND OF THE INVENTION

1. Field of the Invention

This invention relates to a method for determining the road surface condition on the real time basis while a motor vehicle is running, and a controlling device for changing the damping force of the suspension of a motor vehicle according to the determined road surface condition.

2. Description of the Related Art

In order to automatically change the damping force of the suspension according to the road surface condition while a motor vehicle is running, it is necessary to previously determine the road surface condition. Determination of the road surface condition can be effected based on an output of a level sensor which detects the height of the vehicle body of the motor vehicle, for example.

More specifically, if a stroke by which the vehicle body moves in a vertical direction or the speed of the stroke can be continuously derived from the output of the level sensor, whether the road surface condition is a bad road or not can be determined according to the frequency at which the stroke or the speed of the stroke exceeds a predetermined value.

However, in the above road surface-condition determining method, it takes a long time to derive the above frequency and it is impossible to determine the road surface condition on the real time basis. Further, it is only possible to determine whether the road surface is a bad or not when only the above frequency is used, and it is impossible to determine various road surface conditions.

As a result, even when the damping force is changed according to the result of determination obtained by the above determining method, the damping force may not be optimum for the actual road surface condition.

SUMMARY OF THE INVENTION

A first object of this invention is to provide a method for determining the road surface condition on the real time basis while a motor vehicle is running. A second object of this invention is to provide a controlling device for controlling the damping force of a suspension according to the result of the determined road surface condition obtained by the above determining method.

The first object can be attained by a determining method comprising the steps of:

continuously measuring the movement of a vehicle body of the motor vehicle in the vertical direction and outputting movement data;

forming a frequency spectrum of movement values according to the movement data; and specifying the road surface condition based on the frequency spectrum.

According to the above determining method, various road surface conditions can be specified according to the frequency spectrum formed based on the movement data of the vehicle body.

2

The second object can be attained by a controlling device comprising:

means for continuously measuring the movement of a vehicle body of the motor vehicle in the vertical direction and outputting movement data while the motor vehicle is running;

means for forming a frequency spectrum of movement values according to the movement data;

means for specifying the road surface condition based on the frequency spectrum: and means for controlling the damping force of a suspension of the motor vehicle according to the specified road surface condition.

According to the above controlling device, various road surfaces can be specified on the real time basis as in the above determining method, and the damping force of the suspension can be adjusted to a level which is optimum for the specified road surface.

BRIEF DESCRIPTION OF THE DRAWINGS

The present invention, together with its object and advantages, will become more fully understood from the detailed description given herein below and the accompanying drawings, which are given by way of illustration only, and thus, are not limitative of the present invention, and wherein.

DETAILED DESCRIPTION OF THE PREFERRED EMBODIMENTS

Figure 1:
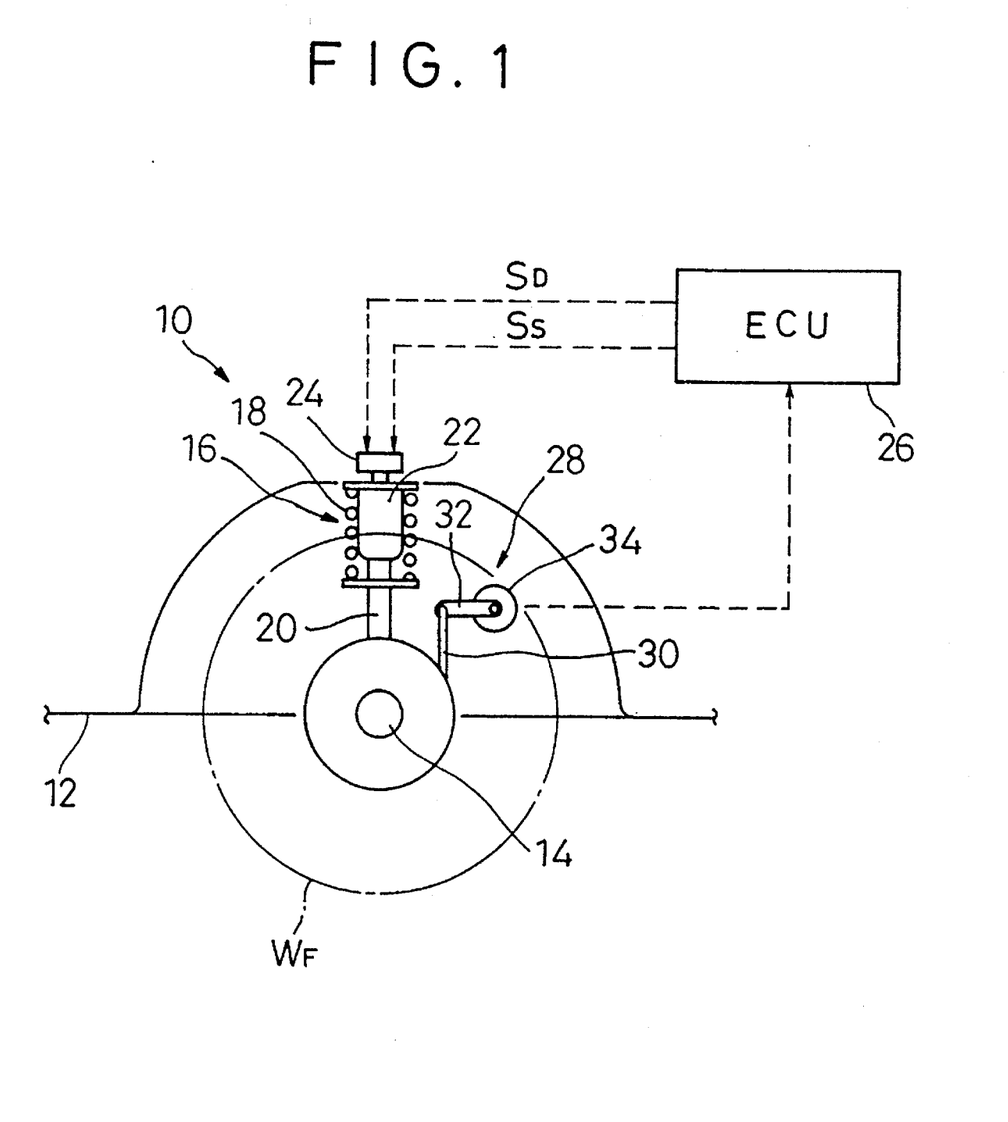
FIG. 1 is a schematic view showing an air suspension.

Referring to FIG. 1, one air suspension 10 is shown, and the air suspension serves to suspend a front wheel $W_F$ from a vehicle body 12. The air suspension comprises a suspension unit 16 disposed between the vehicle body 12 and a front axle 14, and a compression cell spring 18 located around the suspension unit 16.

The suspension unit 16 includes a shock absorber 20 and a pneumatic cylinder 22 disposed on the upper portion of the shock absorber 20. The unit 16 can selectively set the damping force of the suspension to one of three levels, "hard", "medium" and "soft" and adjust the spring constant of the suspension.

The shock absorber 20 has an orifice formed in the internal portion thereof and an orifice valve for adjusting the opening of the orifice. The pneumatic cylinder 22 includes a main air chamber, a sub-air chamber and an air valve for controlling the rate of the air which flows between the main air chamber and the sub-air chamber.

The suspension unit 16 further includes a control actuator 24 disposed on the top portion thereof to change the damping force and adjust the spring constant. The control actuator 24 is electrically connected to an electronic control unit (ECU) 26 and the ECU 26 supplies control signals $S_D$ and $S_S$ to the control actuator 24.

When receiving the control signal $S_D$ from the ECU 26, the control actuator 24 drives the orifice valve of the shock absorber 20 according to the received control signal $S_D$. Therefore, the opening of the orifice is adjusted and the damping force of the suspension is set to one of the "hard", "medium" and "soft".

Further, when receiving the control signal $S_S$ from the ECU 26, the control actuator 24 drives the air valve of the pneumatic cylinder 22 according to the received control signal $S_S$. Therefore, in this case, the air communication between the main air chamber and the sub-air chamber is adjusted and the spring constant of the suspension is changed.

The air suspension 10 further includes a linear stroke sensor 28 which has a link 30, arm 32 and rotary potentiometer 34 as shown in FIG. 1. The lower end portion of the link 30 is fixed on the front axle 14 side and the upper end portion of the link 30 is rotatably coupled to the distal end of the arm 32. The proximal end of the arm 32 is coupled to the shaft of the potentiometer 34. The potentiometer 34 is mechanically fixed on the vehicle body 12 and electrically connected to the ECU 26.

Therefore, when the front axle 14 moves in the vertical direction together with the front wheel $W_F$ relative to the vehicle body 12, the movement is transmitted to the potentiometer 34 via the link 30 and arm 34 so as to cause the shaft of the potentiometer to rotate in a forward or reverse direction. As a result, the potentiometer 34 detects the relative movement between the vehicle body 12 and the front wheel $W_F$, that is, the relative stroke in the vertical direction, and continuously outputs a voltage signal corresponding to the stroke to the ECU 26.

The ECU 26 specifies the type of the road surface on which the motor vehicle is running based on the output of the linear stroke sensor 28. More specifically, as shown in the block diagram of FIG. 2, the ECU 26 includes an analyzing section 36 which can receive an output from the linear stroke sensor 28. The analyzing section 36 subjects the output of the linear stroke sensor 28, that is, the above-described stroke to the frequency analysis (FFT) and creates a spectral distribution based on the result of analysis.

Figure 2:
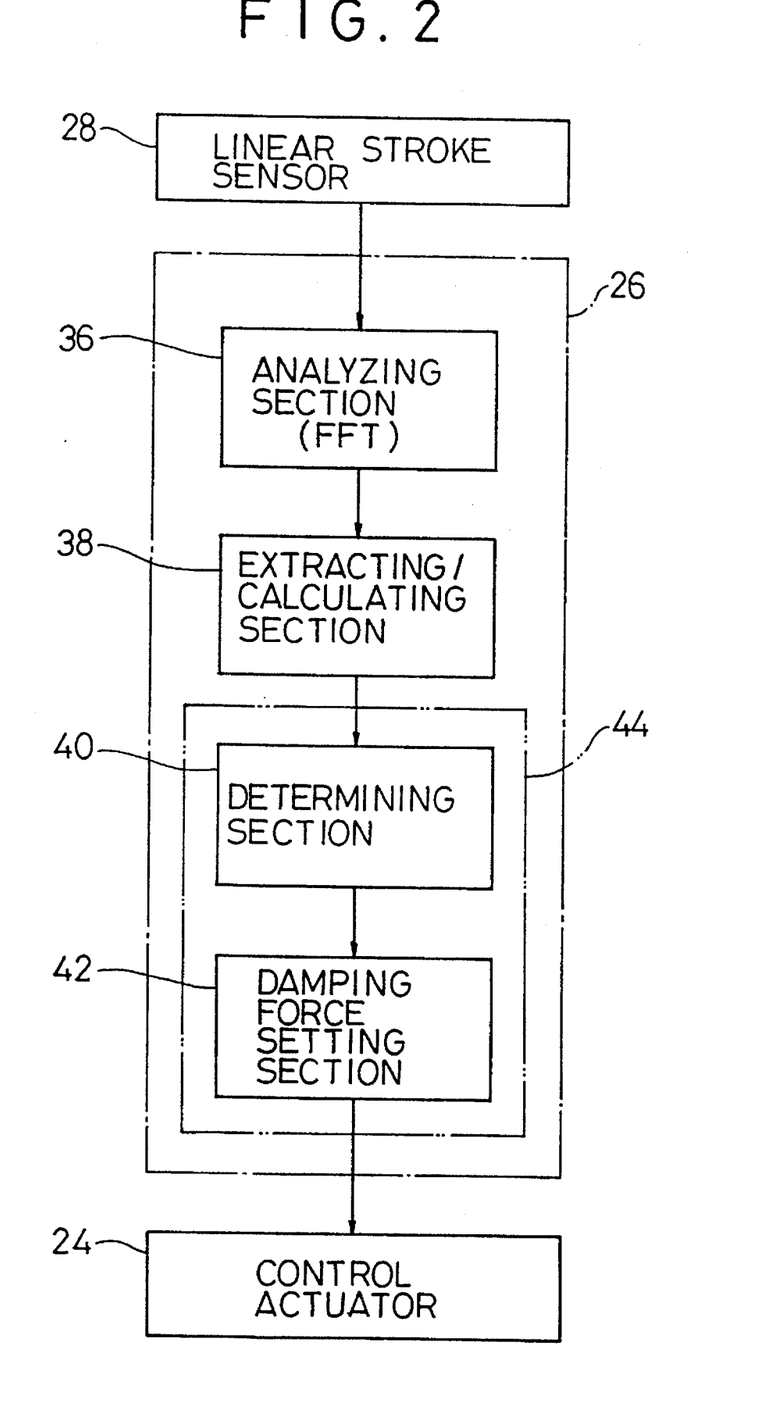
FIG. 2 is a block diagram showing part of an ECU which shown in FIG. 1.

For example, the ECU 26 fetches the output of the linear stroke sensor 28 for every 30 milliseconds and the analyzing section 36 creates a spectral distribution for every 60 milliseconds.

The spectral distribution created by the analyzing section 36 is supplied to an extracting/calculating section 38. The extracting/calculating section 38 extracts spectral values inherent to a specified road surface from the spectral distribution and derives a characteristic value based on the extracted spectral values.

FIGS. 3 to 7 show the results of experiments obtained when the motor vehicle is running on various types of road surfaces, that is, various types of model roads and each of the results of the experiments indicates the relation between the level of the stroke and the frequency of vibration input to the vehicle body 12.

Figure 3:
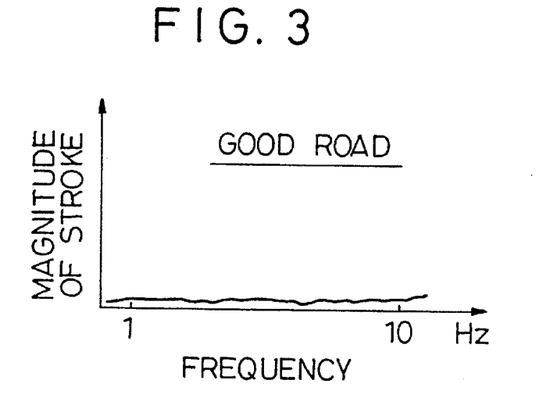
FIG. 3 is a graph showing the result obtained by subjecting an output of a linear stroke sensor to the frequency analysis in a case of a good road surface.

FIG. 3 indicates the result of experiment obtained when the model road on which the motor vehicle runs is a flat and good road. In this case, the characteristic curve indicating the level of the stroke does not have a portion which exhibits a peak in a particular frequency range, and therefore, the level of the stroke is small in the entire frequency range.

Figure 4:
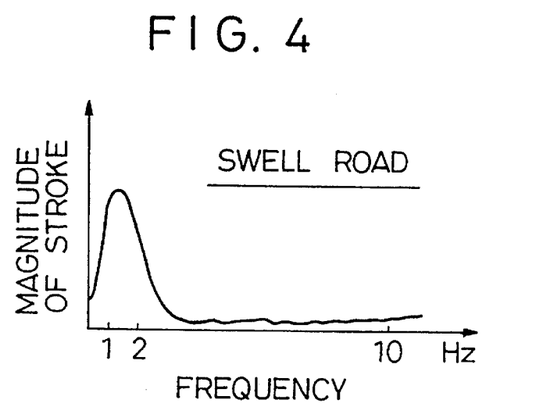
FIG. 4 is a graph showing the result obtained by subjecting an output of the linear stroke sensor to the frequency analysis in a case of a swell road surface.

FIG. 4 indicates the result of experiment obtained when the model road is a swell road. The swell road is a wavy road surface having a relatively long wavelength. In this case, the characteristic curve indicating the level of the stroke has a portion which exhibits a peak in a frequency range of 1 Hz to 2 Hz (near the resonance point of the sprung mass of the motor vehicle), and the level of the stroke is small in the other frequency range.

Figure 5:
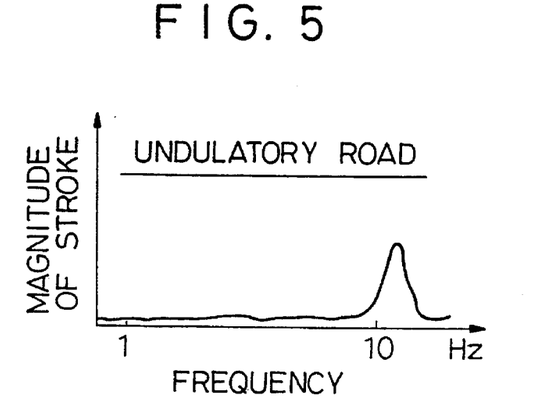
FIG. 5 is a graph showing the result obtained by subjecting an output of the linear stroke sensor to the frequency analysis in a case of an undulatory surface.

FIG. 5 indicates the result of experiment obtained when the model road is an undulatory road. The undulatory road has a wavy road surface having a wavelength shorter than that of the swell road. In this case, the characteristic curve indicating the level of the stroke has a portion which exhibits a peak in a frequency range of 11 Hz to 14 Hz, and the level of the stroke is small in the other frequency range.

Figure 6:
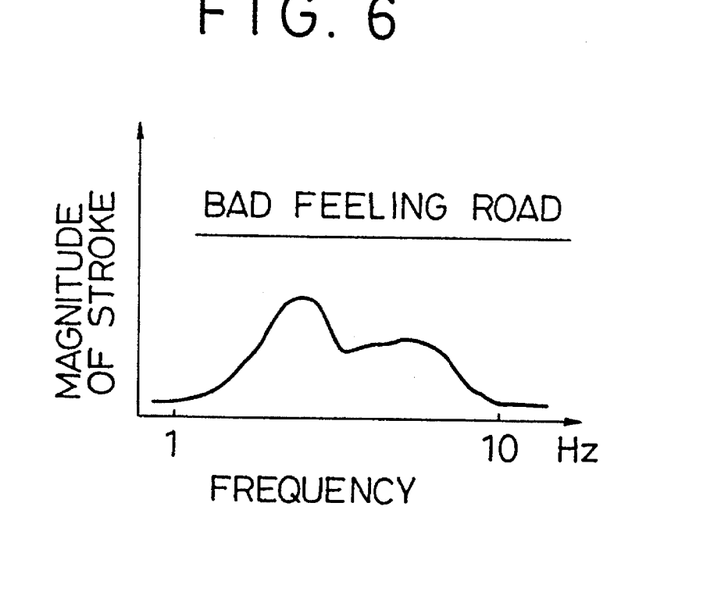
FIG. 6 is a graph showing the result obtained by subjecting an output of the linear stroke sensor to the frequency analysis in a case of a bad feeling road surface.

FIG. 6 indicates the result of experiment obtained when the model road is a bad feeling road. The bad feeling road has a characteristic curve indicating that the level of the stroke becomes large in a frequency range of 4 Hz to 8 Hz. Generally, a man is sensitive to the vibration of a frequency of 4 Hz to 8Hz, and therefore, if the frequency of vibration of the vehicle body 12 lies in the frequency range of 4 Hz to 8 Hz and the level of the stroke is large, a passenger will receive hard and rough ride-feeling.

Figure 7:
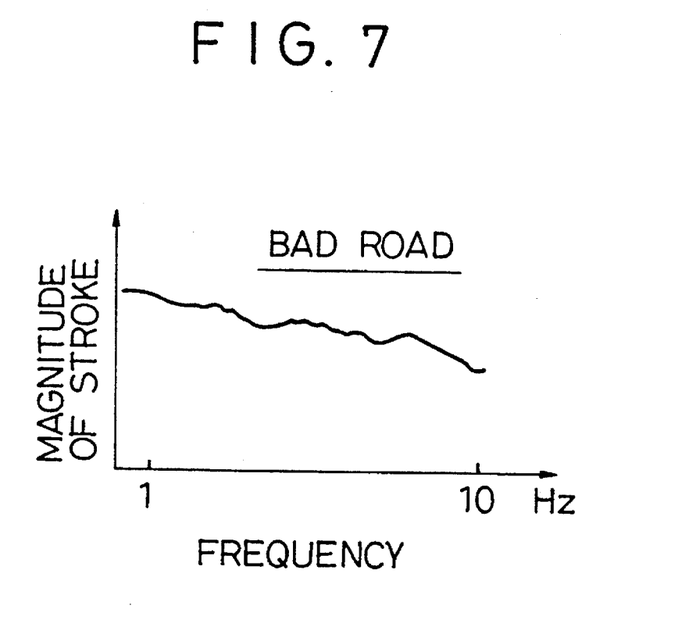
FIG. 7 is a graph showing the result obtained by subjecting an output of the linear stroke sensor to the frequency analysis in a case of a bad road surface state.

FIG. 7 indicates the result of experiment obtained when the model road is a bad road. In this case, the bad road has a characteristic curve indicating that the level of the stroke becomes large in the entire vibration frequency range.

In the spectral distribution obtained by the frequency analysis (FFT) described before, the relation between the spectral values SPE N (N=1 to 31) and the vibration frequency of the vehicle body 12 is determined as indicated by the following table in this embodiment.

TABLE

| Frequency (Hz) | Spectral Value |
|---|---|
| 0.52 | SPE 0 |
| 1.04 | SPE 1 |
| 1.56 | SPE 2 |

TABLE-continued

| Frequency (Hz) | Spectral Value |
| --- | --- |
| 2.08 | SPE 3 |
| 2.60 | SPE 4 |
| 3.12 | SPE 5 |
| 3.64 | SPE 6 |
| 4.16 | SPE 7 |
| 4.68 | SPE 8 |
| 5.20 | SPE 9 |
| 5.72 | SPE 10 |
| 6.24 | SPE 11 |
| 6.76 | SPE 12 |
| 7.28 | SPE 13 |
| 7.80 | SPE 14 |
| 8.32 | SPE 15 |
| 8.84 | SPE 16 |
| 9.36 | SPE 17 |
| 9.88 | SPE 18 |
| 10.40 | SPE 19 |
| 10.92 | SPE 20 |
| 11.44 | SPE 21 |
| 11.98 | SPE 22 |
| 12.48 | SPE 23 |
| 13.00 | SPE 24 |
| 13.52 | SPE 25 |
| 14.04 | SPE 26 |
| 14.56 | SPE 27 |
| 15.08 | SPE 28 |
| 15.60 | SPE 29 |
| 16.12 | SPE 30 |
| 16.64 | SPE 31 |

Thus, in the case of this embodiment, as is clearly seen from FIG. 4, the spectral values SPE 1, SPE 2 and SPE 3 contained in the frequency range of 1 Hz to 2 Hz can be defined as the spectral value SPE N inherent to the swell road. Therefore, the characteristic value $F_1$ indicating the swell road can be derived from the moving average of the sum of spectral values SPE 1, SPE 2 and SPE 3, that is, based on the following equation.

$$F_1 = (1/p) \cdot \Sigma(\text{SPE 1}(i) + \text{SPE 2}(i) + \text{SPE 3}(i))$$

As is clearly understood from FIG. 5, the spectral values SPE 20 to SPE 26 contained in the frequency range of 11 Hz to 14 Hz can be defined as the spectral value N inherent to the undulatory road. Therefore, the characteristic value $F_2$ indicating the undulatory road can be derived from the moving average of the sum of spectral values SPE 20 to SPE 26 as indicated by the following equation.

$$F_2 = (1/p) \cdot \Sigma(\text{SPE 20}(i) + \text{SPE 21}(i) + \cdots + \text{SPE 26}(i))$$

Likewise, as is clearly understood from FIG. 6, the spectral values SPE 7 to SPE 14 contained in the frequency range of 4 Hz to 8 Hz can be defined as the spectral value SPE N inherent to the bad feeling road. Therefore, the characteristic value $F_3$ indicating the bad feeling road can be derived from the moving average of the sum of spectral values SPE 7 to SPE 14 as indicated by the following equation.

$$F_3 = (1/p) \cdot \Sigma(\text{SPE 7}(i) + \text{SPE 8}(i) + \cdots + \text{SPE 14}(i))$$

Further, as is clearly understood from FIG. 7, the spectral values contained in the entire frequency range can be defined as the spectral value SPE N inherent to the bad road. However, in this case, in order to simplify the calculation, the spectral values SPE 6 to SPE 31 are selected. Therefore, the characteristic value $F_4$ indicating the bad road can be derived from the moving average of the sum of spectral values SPE 6 to SPE 31 as indicated by the following equation.

$$F_4 = (1/p) \cdot \Sigma(\text{SPE 6}(i) + \text{SPE 7}(i) + \cdots + \text{SPE 31}(i))$$

In the above four equations, p indicates the number of data items of the spectral values and the initial value and upper limit of i are respectively set to (n-p) and n.

Further, in this embodiment, a learning value $F_{4LN}$ of the calculated characteristic value $F_4$ can be derived according to the following equation.

$$F_{4LN} = (1/q) \cdot \Sigma(F_4(i))$$

where q indicates the number of data items, and in this case, the initial value and upper limit of i are respectively set to (n-q) and n. It is preferable to set q to a relatively large value, and in this embodiment, q is set to be equal to 2 p.

Figure 8:
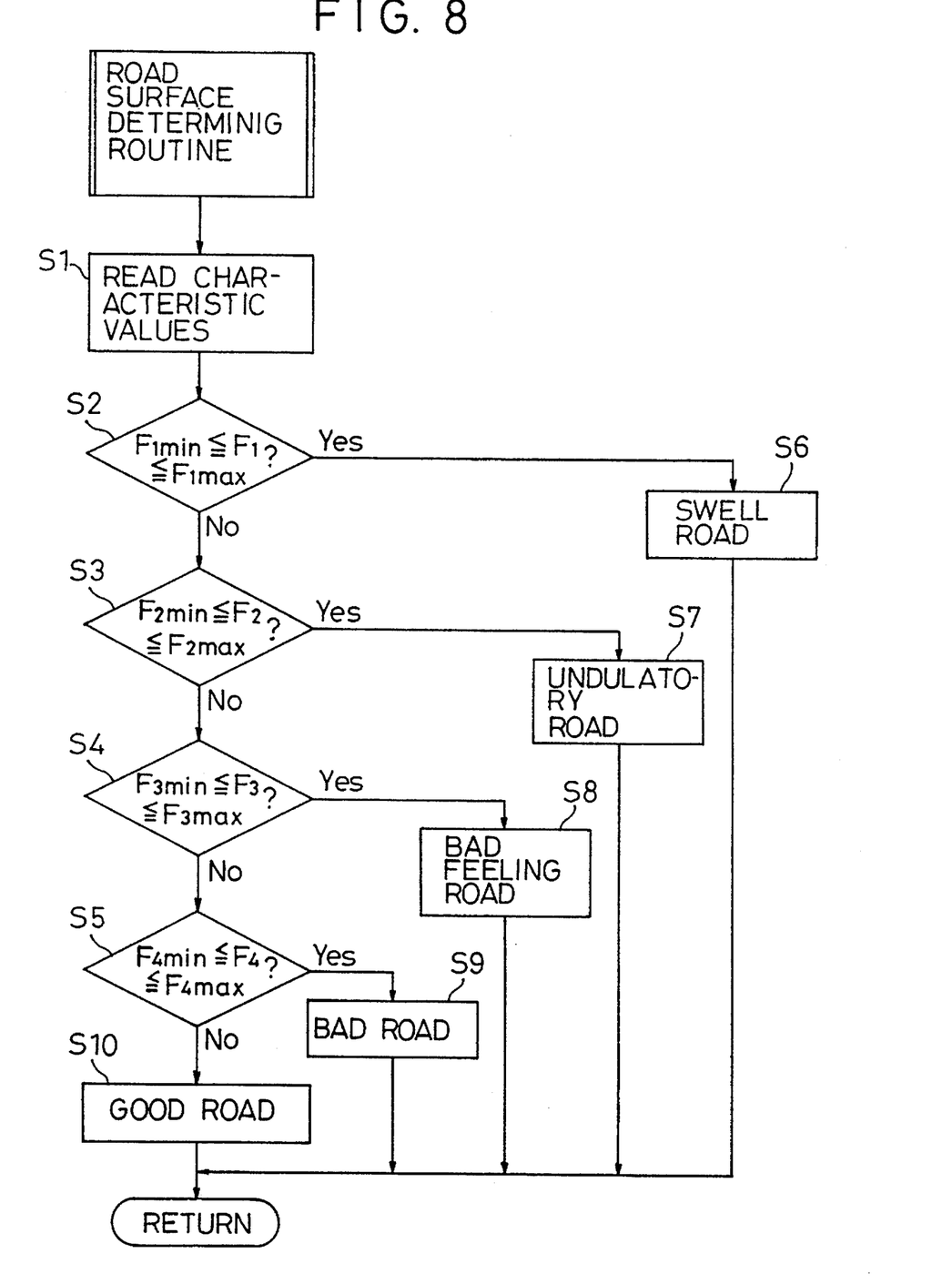
FIG. 8 is a flow chart illustrating the road surface condition determining routine effected by the ECU.

When the characteristic values $F_1$, $F_2$, $F_3$ and $F_4$ and the learning value $F_{4LN}$ are calculated, these values are supplied from the extracting/calculating section 38 to a determining section 40. The determining section 40 specifies the type of the road surface on which the motor vehicle is running based on the characteristic values and the learning value. More specifically, the determining section 40 executes the road surface determining routine. The road surface determining routine is shown in FIG. 8.

Road Surface Determining Routine

When the road surface determining routine is executed, it should be noted that the ranges of the characteristic values F, that is, the maximum values and minimum values of the characteristic values are previously prepared. For example, the maximum value $F_{1max}$ and minimum value $F_{1min}$ of the characteristic value $F_1$ can be prepared based on the results of running tests obtained by driving a motor vehicle on various swell roads having swells of different sizes. Further, maximum and minimum values of the other characteristic values may be prepared in substantially the same manner. The ranges defined by the maximum values and minimum values of the respective characteristic values F are set so as not to overlap each other.

First, in the step S1, the determining section 40 reads the characteristic values $F_1$, $F_2$, $F_3$ and $F_4$ from the extracting/calculating section 38. After this, in the steps S2, S3, S4 and S5, it is checked whether or not the characteristic values F are set within the predetermined ranges, that is, ranges between the corresponding maximum values and corresponding minimum values.

If the characteristic value $F_1$ lies between the maximum value $F_{1max}$ and minimum value $F_{1min}$ and the result of discrimination in the step S2 is "YES", the road is determined to be the swell road as indicated by FIG. 4 in the next step S6.

If the characteristic value $F_2$ lies between the maximum value $F_{2max}$ and minimum value $F_{2min}$ and the result of discrimination in the step S3 is "YES", the road is determined to be the undulatory road as indicated by FIG. 5 in the next step S7.

If the characteristic value $F_3$ lies between the maximum value $F_{3max}$ and minimum value $F_{3min}$ and the result of discrimination in the step S4 is "YES", the road is determined to be the bad feeling road as indicated by FIG. 6 in the next step S8.

If the characteristic value $F_4$ lies between the maximum value $F_{4max}$ and minimum value $F_{4min}$ and the result of discrimination in the step S5 is "YES", the road is determined to be the bad road as indicated by FIG. 7 in the next step S9.

When the result of discrimination in each of the steps S2, S3, S4 and S5 is "NO", the road is determined to be the good road as indicated by FIG. 3 in the step S10.

The above road surface determining routine is repeatedly effected at a predetermined controlling cycle, and as a result, determination of the road surface can be effected on the real time basis.

Figure 9:
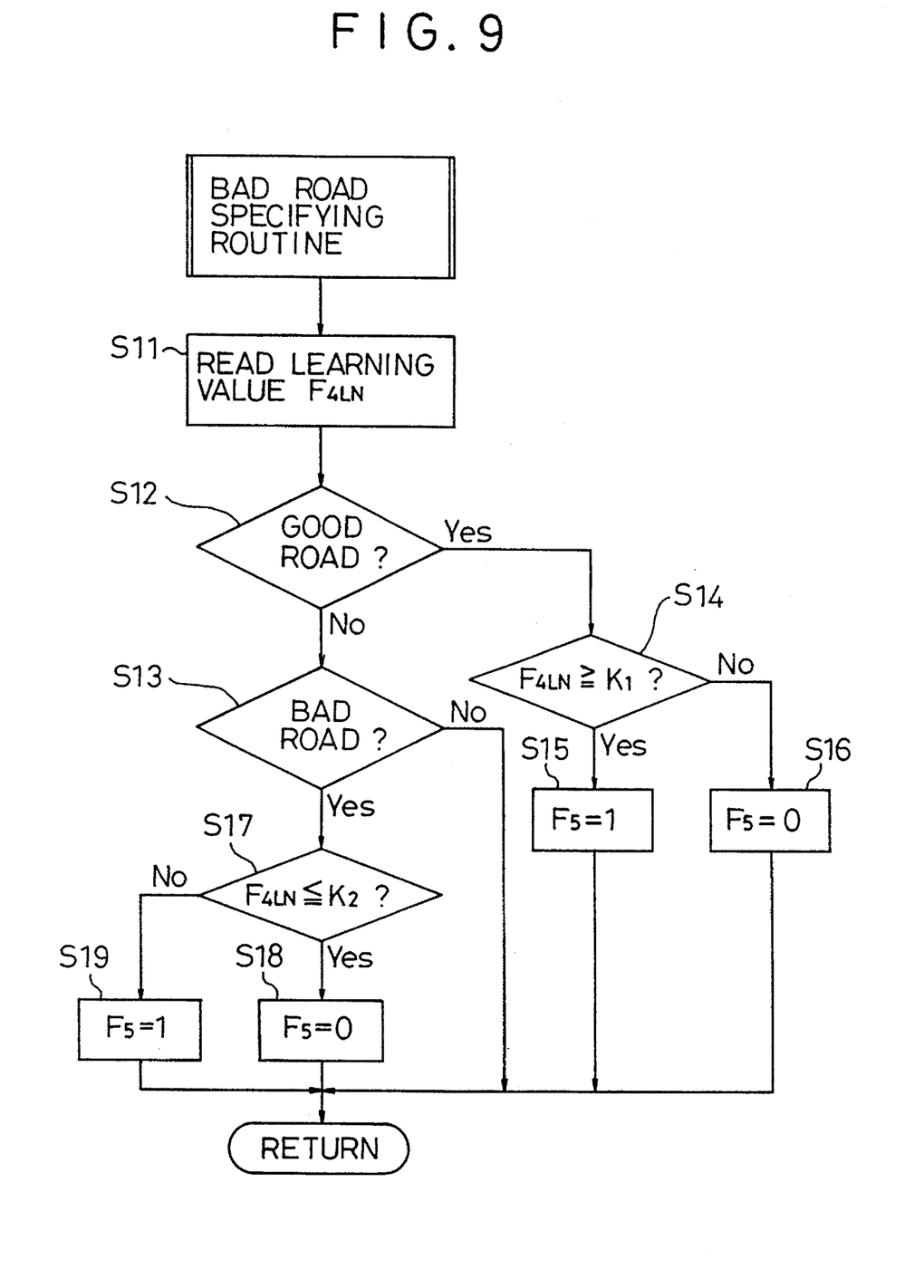
FIG. 9 is a flow chart illustrating the bad road specifying routine effected by the ECU.

In the case of this embodiment, the determining section 40 executes the bad road specifying routine as indicated in FIG. 9 at predetermined periodic intervals (by timer interruption) independently from the road surface determining routine. The bad road specifying routine is explained below.

Bad Road Specifying Routine

In the step S11, the determining section 40 reads the learning value $F_{4LN}$. After this, it is checked in the next step S12 whether the road is a good road or not and it is checked in the step S13 whether the road is a bad road or not. Discriminations in the steps S12 and S13 are effected based on the result of the road surface determining routine.

When the result of discrimination in the step S12 is "YES", the step S14 is effected to check whether the learning value $F_{4LN}$ is not less than a preset value $K_1$ or not. When the result of discrimination in the step S14 is "YES", a bad road flag $F_5$ is set to "1" (step S15), and when the result of discrimination is "NO", the bad road flag $F_5$ is set to "0" (step S16).

When the result of discrimination in the step S12 is "NO", the step S13 is effected. When the result of discrimination in the step S13 is "YES", it is checked whether the learning value $F_{4LN}$ is not more than a preset value $K_2$ or not (step S17). In this case, the preset value $K_2$ is set to be smaller than the preset value $K_1$.

When the result of discrimination in the step S17 is "YES", the bad road flag $F_5$ is set to "0" (step S18) and when the result of discrimination is "NO", the bad road flag $F_5$ is set to "1" (step S19).

When the result of discrimination in each of the steps S12 and S13 is "NO", the bad road flag $F_5$ is not reset and is kept at the same value as that which is set before.

If the above bad road specifying routine is effected together with the road surface determining routine, whether the road is a bad road or not can be determined with higher reliability. That is, even when the road is determined to be a good road in the road surface determining routine (step S12), it can be specified that the road is a good road but bad road portions such as differences in level or irregularities intermittently and continually appear on the road surface if the learning value $F_{4LN}$ is not less than the preset value $K_1$. Therefore, when the result of discrimination in the step S14 is "YES" and the bad road flag $F_5$ is set to "1", the bad road flag $F_5$ having a value "1" indicates that the road is substantially a bad road.

In contrast, even when the road is determined to be a bad road in the road surface determining routlne (step S13), it can be specified that bad road portions such as differences in level or irregularities only temporarily appear on the road surface if the learning value $F_{4LN}$ is smaller than the preset value $K_2$. Therefore, when the result of discrimination in the step S18 is "YES" and the bad road flag $F_5$ is set to "0", the bad road flag $F_5$ having a value "0" indicates that the road is substantially a good road.

Figure 10:
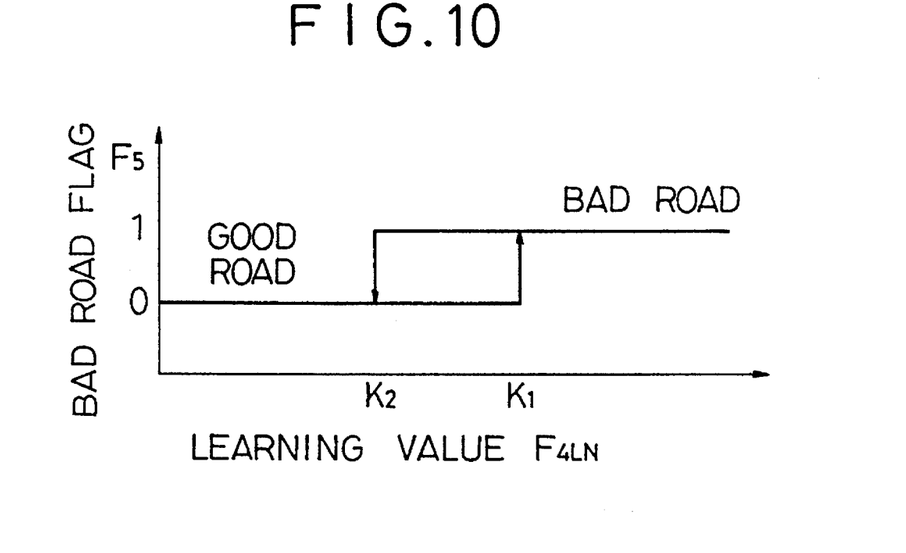
FIG. 10 is a graph showing the relation between value obtained by learning and a bad road flag.

Further, as is clearly seen from FIG. 10, since the operation of changing the bad road flag $F_5$ has a hysteresis characteristic caused by the difference between the preset values $K_1$ and $K_2$, no hunting will occur in the operation of changing the bad road flag $F_5$.

When the type of the road is determined in the road surface determining routine and the bad road flag is set in the bad road specifying routine, the results are supplied from the determining section 40 to a damping force setting section 42 as shown in FIG. 2. The setting section 42 determines the damping force of the air suspension 10 based on the type of the road and the bad road flag.

More specifically, the damping force of the air suspension 10 is set to the "hard" or "medium" according to the level of the characteristic value $F_1$ when the road is determined to be a swell road. Therefore, a control signal $S_D$ for setting the damping force to the "hard" or "medium" is supplied from the setting section 42 to the control actuator 24 of the air suspension 10 so as to actually operate the control actuator 24.

When the road is a swell road and the damping force of the air suspension 10 is set at the "soft" while the motor vehicle is running, the sprung mass of the motor vehicle such as the vehicle body lying above the air suspension 10 tend to resonate. However, when the damping force of the air suspension 10 is set at the "hard" or "medium" in the above road surface condition, the resonance of sprung mass can be prevented, and as a result, the passenger will not receive soft and unsteady ride-feeling.

The damping force of the air suspension 10 is set to the "medium" for, for example, 1 second under a condition that the characteristic value $F_2$ is not less than a preset value. After this, the damping force of the air suspension 10 is repeatedly set to and kept at the "medium" for one second if the above condition is satisfied. When the above condition is not satisfied, the damping force of the air suspension 10 is changed to the "soft".

In this case, the resonance of unsprung mass of the vehicle body such as wheels disposed below the air suspension 10 is suppressed and sufficiently good contact can be attained between the road surface and the wheels.

When the road is determined to be a bad feeling road, the damping force of the air suspension 10 is changed to the "soft" and the passenger will not receive hard and rough ride-feeling.

When the road is determined to be a bad road, the damping force of the air suspension 10 is changed to the "hard". When the road is determined to be a good road, the damping force of the air suspension 10 is changed to the "soft".

Further, even when the road is determined to be a bad road, it may be considered that bad road portions such as differences in level and irregularities only temporarily appear on the road surface as described before if the bad road flag $F_5$ is set to "0". In this case, the damping force of the air suspension 10 is changed to the "hard" for, for example, 2 seconds, and after this, it is set to the "soft". If the changeover of the damping force is effected as described above, the resonance of the sprung mass of the motor vehicle can be effectively suppressed even when the motor vehicle is running on the bad road portion such as differences in level and irregularities, and thus the motor vehicle becomes significantly comfortable to ride in.

Even when the road is determined to be a good road, it may be considered that the road is substantially a bad road as described before if the bad road flag $F_5$ is set to "1". In this case, the damping force of the air suspension 10 is changed to the "hard".

In the case of a system in which the damping force of the air suspension 10 is also controlled by use of a control routine different from the control routine of this embodiment and the different control routine has an automatic mode and a fixed mode, the control routine of this embodiment can be effected under a condition that the different control routine is set in the automatic mode and the damping force changing control by the different control routine is not effected. As the damping force changing control by the different control routine, the roll control for the vehicle body, brake dive control, anti-squat control, pitching-bouncing control and the like may be provided. Further, the control routine of this embodiment can be effected when the vehicle speed is higher than a preset value and the above conditions are satisfied.

Figure 11:
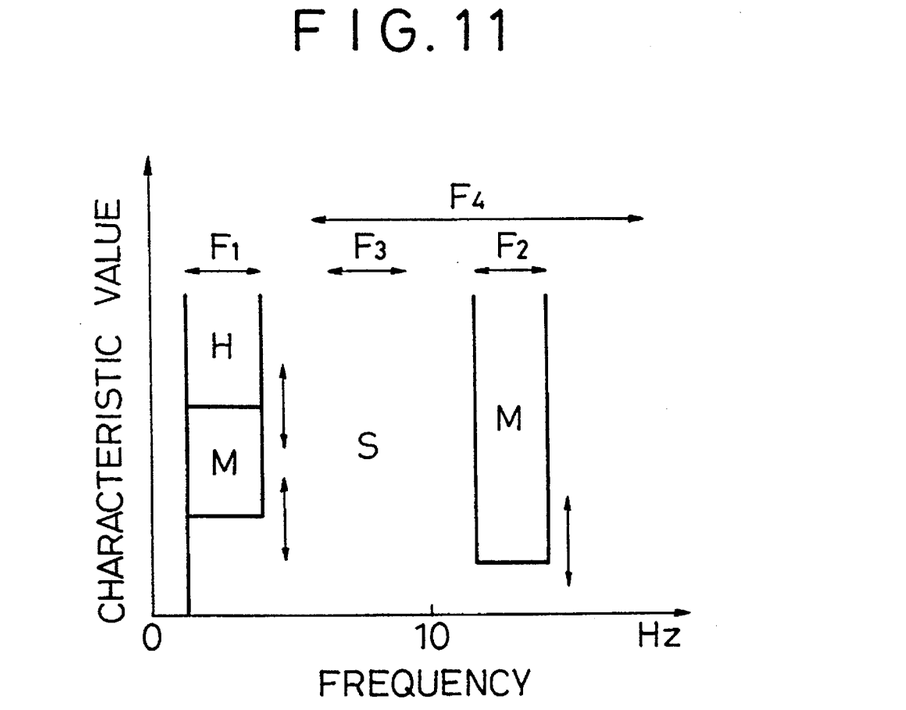
FIG. 11 is a graph showing a damping force changing region.
Figure 12A:
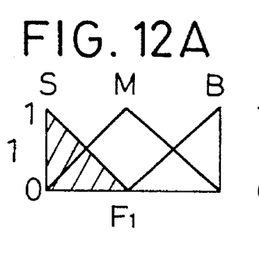
FIGS. 12A to 12C are graphs for illustrating the rule 1 of fuzzy inference.
Figure 12B:
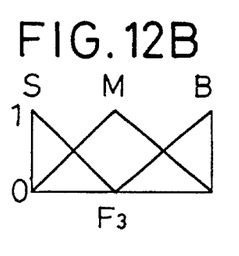
Figure 12C:
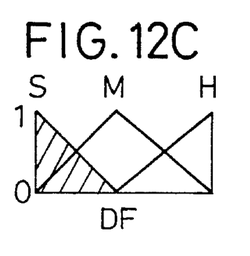
Figure 13A:
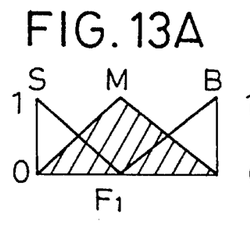
FIGS. 13A to 13C are graphs for illustrating the rule 2 of fuzzy inference.
Figure 13B:
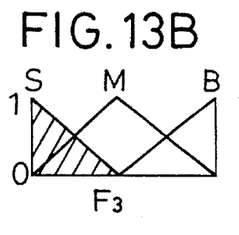
Figure 13C:
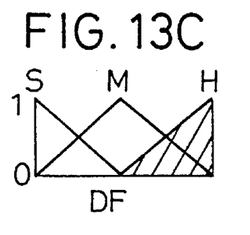
Figure 14A:
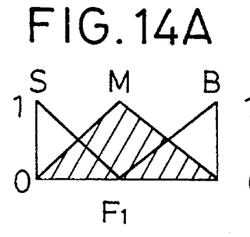
FIGS. 14A to 14C are graphs for illustrating the rule 3 of fuzzy inference.
Figure 14B:
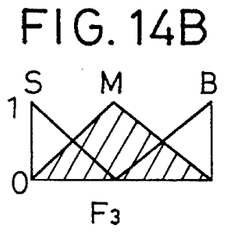
Figure 14C:
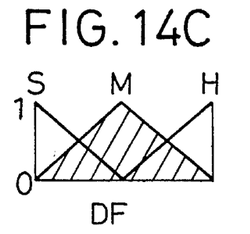
Figure 15A:
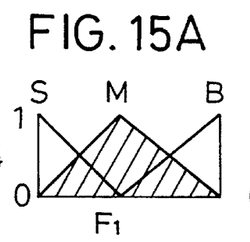
FIGS. 15A to 15C are graphs for illustrating the rule 4 of fuzzy inference.
Figure 15B:
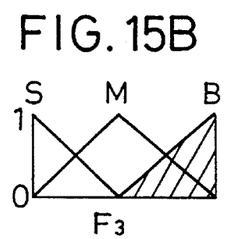
Figure 15C:
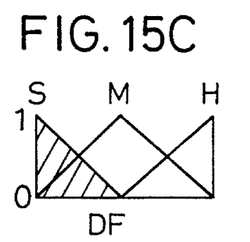
Figure 16A:
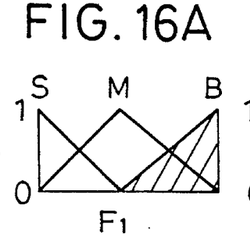
FIGS. 16A to 16C are graphs for illustrating the rule 5 of fuzzy inference.
Figure 16B:
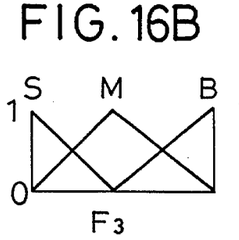
Figure 16C:
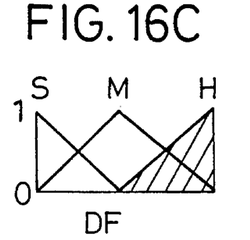

The damping force changing control by the control routine of this embodiment may be clearly understood from FIG. 11, and in FIG. 11, H, M and S respectively indicate the damping forces of "hard", "medium" and "soft".

In the determining section 40 and setting section 42, the damping force of the suspension 10 is determined based on the calculated characteristic values and the bad road flag, but the sections 40 and 42 can be replaced by an inference section 44 as shown in FIG. 2. The inference section 44 determines the damping force of the suspension 10 based on the fuzzy inference using the characteristic values $F_1$ and $F_3$ as input variables, for example.

As is clearly understood from the above explanation, the characteristic value $F_1$ indicates the degree of soft and unsteady ride-feeling which the passenger receives and the characteristic value $F_3$ indicates the degree of hard and rough ride-feeling which the passenger receives.

FIGS. 12 to 16 show membership functions respectively representing the rules of the fuzzy inference and the rules are defined as follows. In the membership functions of FIGS. 12 to 16, areas indicating the above rules are hatched, respectively.

Rule 1

The damping force DF of the air suspension 10 is set to the "soft" irrespective of the characteristic value $F_3$ if the characteristic value $F_1$ is small.

Rule 2

The damping force DF of the air suspension 10 is set to the "hard" if the characteristic value $F_1$ is set at an approximately medium and the characteristic value $F_3$ is small.

Rule 3

The damping force DF of the air suspension 10 is set to the "medium" if both of the characteristic values $F_1$ and $F_3$ are set at approximately medium.

Rule 4

The damping force DF of the air suspension 10 is set to the "soft" if the characteristic value $F_1$ is at an approximately medium and the characteristic value $F_3$ is big.

Rule 5

The damping force DF of the air suspension 10 is set to the "hard" irrespective of the characteristic value $F_3$ if the characteristic value $F_1$ is big.

The road to which the rule 1 is applied is flat and has no swell, that is, good road, and in this case, even if the damping force of the air suspension 10 is set at the "soft", the passenger will not receive soft and unsteady ride-feeling.

The road to which the rule 2 is applied has middle-sized swells, and in this case, if the damping force of the air suspension 10 is set at the "hard", resonance of the sprung mass of the motor vehicle is suppressed and the passenger will not receive soft and unsteady ride-feeling. Since the characteristic value $F_3$ is small in the case of the swell road, vibration to which a man is sensitive is not input to the vehicle body 12 and the passenger will not receive hard and rough ride-feeling even if the damping force of the air suspension 10 is set at the "hard".

The road to which the rule 3 is applied has middle-sized swells and small irregularities, and in this case, if the damping force of the air suspension 10 is set at the "medium", the degrees of the soft and unsteady ride-feeling and hard and rough ride-feeling which the passenger will receive can be simultaneously reduced.

The road to which the rule 4 is applied has middle-sized swells and relatively large irregularities, and in this case, if the damping force of the air suspension 10 is set at the "soft", input of vibration caused by the irregularities to the vehicle body can be effectively suppressed and the passenger will not receive hard and rough ride-feeling.

The road to which the rule 5 is applied has relatively large swells. and in this case, if the damping force of tile air suspension 10 is set at the "hard", the passenger will not. receive soft and unsteady ride-feeling.

When the characteristic values $F_1$ and $F_3$ are calculated, the respective rules are effected for the characteristic values $F_1$ and $F_3$ in the inference section 44 and tile final target damping force of the air suspension 10 is determined based on the results of execution of the respective rules. More specifically, the hatched areas of the membership functions indicating the results of execution of the respective rules are overlapped with each other and the damping force obtained in position which is nearest to the centroid of the overlapped hatched area is selected.

Figure 17:
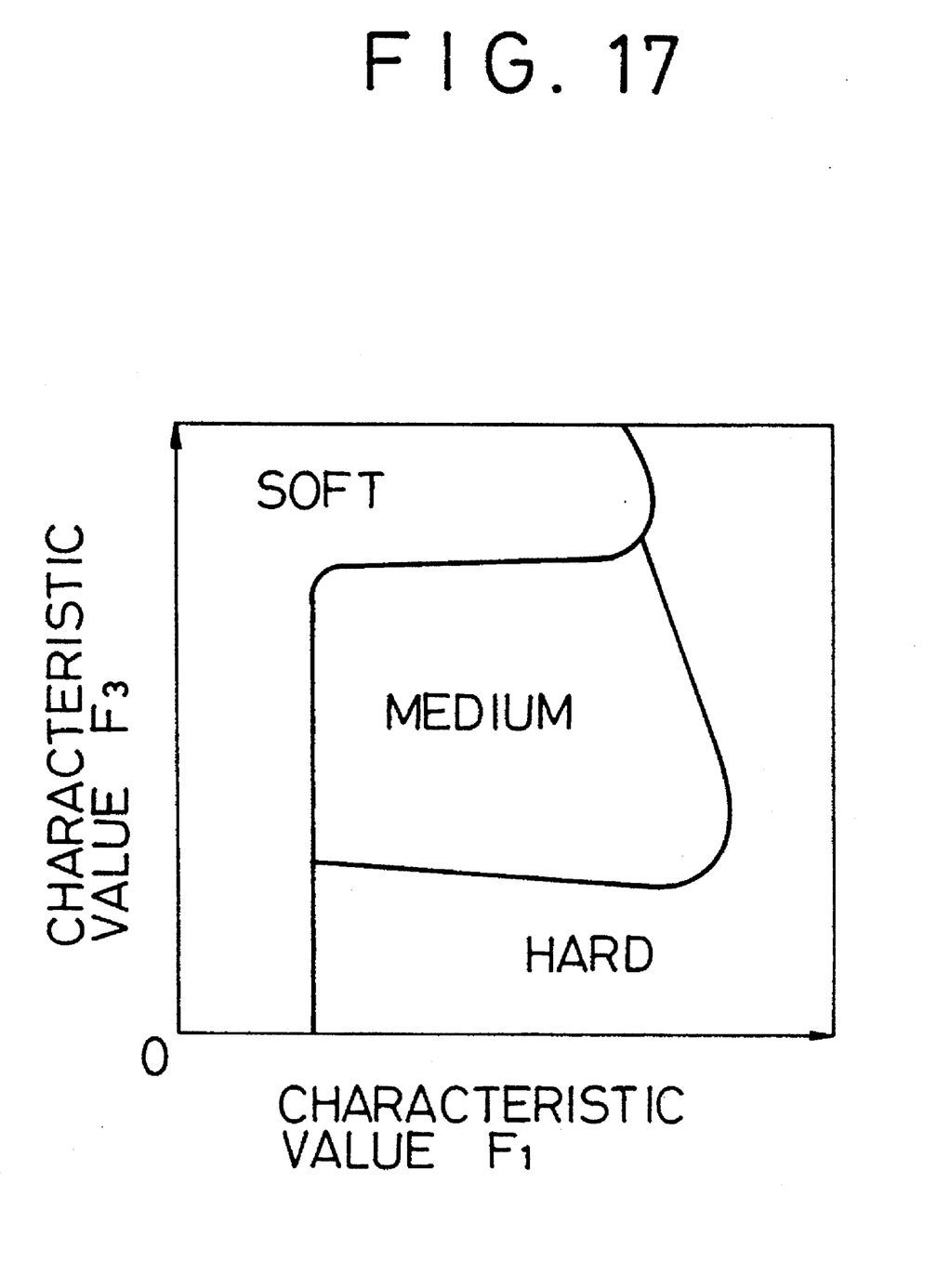
FIG. 17 is a graph showing a damping force changing region.

In order to simplify the inference process necessary for determination of the damping force and effect the same at a high speed, it is preferable to provide such a map as shown in FIG. 17 in the ECU 26. In the map of FIG. 17, the level of the damping force is divided according to the characteristic values $F_1$ and $F_3$.

When the damping force of the air suspension 10 is changed from the "hard" to the "soft" in the damping force changing control, it is preferable to first change the damping force from the "hard" to the "medium", keep it at the "medium" for 1 second and then change the damping force from the "medium" to the "soft".

This invention is not limited to the above embodiment and various modifications can be made. For example, it is possible to use an acceleration sensor instead of the linear stroke sensor in order to detect the movement of the vehicle body in the vertical direction.

What is claimed is:

1. A method for determining a condition of a road surface while a motor vehicle is travelling on the road surface, comprising:

(a) continuously measuring a vertical movement of a body of said motor vehicle;

(b) obtaininq a frequency distribution of said vertical movement;

(c) dividing said frequency distribution into a plurality of different frequency regions;

(d) calculating average values of said frequency distribution for a predetermined length of time within each of said frequency regions; and (e) specifying said condition of said road surface based on said average values of said frequency distribution for each of said frequency regions.

2. The method of claim 1, wherein said step (e) includes the substeps of (e1) comparing said average values of said frequency distribution for each of said frequency regions with predetermined values, each corresponding to said different frequency regions and (e2) determining said condition of said road surface based on comparison results in said step (e1).

3. The method of claim 2 wherein said predetermined values include at least a first value corresponding to a swell road and an undulatory road, said swell road having a longer wavelength than said undulatory road.

4. The method of claim 1, wherein said step (d) includes the substeps of
(d1) calculating a first average value of said frequency distribution for a first predetermined length of time within each of said frequency regions, and
(d2) calculating a second average value of said first average value of a frequency region corresponding to a bad road for a second predetermined length of time longer than said first predetermined length of time; and wherein
said step (e) specifies said condition of said road surface based on said first average value and said second average value.

5. The method of claim 1, wherein said step (a) measures a relative movement between said body and a wheel as said vertical movement of said body.

6. The method of claim 1, wherein said step (a) measures an acceleration of said body in a vertical direction as said vertical movement of said body.

7. The method of claim 1, further comprising:
(f) controlling a damping force of a suspension system installed in said vehicle according to said road surface condition specified in said step (e).

8. A device for determining a road surface condition, comprising:
a sensor continuously measuring a vertical movement of a body of a vehicle;
obtaining means for obtaining a frequency distribution of said vertical movement measured by said sensor;
dividing means for dividing said frequency distribution into a plurality of different frequency regions;
average calculating means for calculating average values of said frequency distribution for a predetermined length of time within each of said frequency regions; and
specifying means for specifying said road surface condition based on said average values for each of said frequency regions.

9. A device according to claim 8, wherein said specifying means includes comparison means for comparing said average values with predetermined values each corresponding to various road surfaces, and determining means for determining said road surface condition based on results of comparison from said comparison means.

10. A device according to claim 9, wherein said comparison means contains spectral data items inherent to at least two road surfaces among a swell road, flat road, undulatory road and bad road, the swell road having a longer wavelength than the undulatory road.

11. A device according to claim 10, wherein said comparison means contains a spectral data item inherent to a first bad road in which bad road portions continually occur and a spectral data item inherent to a second bad road in which bad road portions intermittently occur as the spectral data inherent to the bad road.

12. A device according to claim 8, further comprising means for variably and selectively setting the damping force of the suspension to one of at least two levels.

13. A device for controlling a suspension of a vehicle comprising:
a sensor continuously measuring a vertical movement of a body of said vehicle;
obtaining means for obtaining a frequency distribution of said vertical movement measured by said sensor;
dividing means for dividing said frequency distribution into a plurality of different frequency regions;
average calculating means for calculating average values of said frequency distribution for a predetermined length of time within each of said frequency regions; and
specifying means for specifying said road surface condition based on said average values for each of said frequency regions;
control amount calculating means for calculating a control amount of said suspension according to said road surface condition specified by said specifying means; and
adjusting means for adjusting said suspension based on said control amount calculated by said control amount calculating means.

14. A device according to claim 13, wherein said control amount calculating means includes means for calculating the adaptation relative to a plurality of levels of damping forces based on the characteristic value.

15. A device according to claim 14, wherein said different frequency regions include a first frequency region close to a resonance point of sprung mass of said vehicle and a second frequency region to which a man is sensitive.

16. A device according to claim 15, wherein said second frequency region to which a man is sensitive is between about 4 Hz and about 8 Hz.

17. A device according to claim 13, wherein said control amount calculating means determines said control amount by a fuzzy inference based on said average value of each of said frequency regions.

18. A device according to claim 17, wherein said average values of each of said frequency regions used to determine said control amount represent at least a swell road and a bad feeling road.

* * * * *